United States Patent [19]

Amelio et al.

[11] 3,891,977

[45] June 24, 1975

[54] CHARGE COUPLED MEMORY DEVICE

[75] Inventors: Gilbert F. Amelio, Saratoga; Jack A. Livezey, San Jose; Phillip J. Salsbury, Sunnyvale, all of Calif.

[73] Assignee: Fairchild Camera and Instrument Corporation, Mountain View, Calif.

[22] Filed: July 15, 1974

[21] Appl. No.: 488,387

[52] U.S. Cl. .................. 340/173 R; 357/24; 357/45

[51] Int. Cl. .................. G11c 11/40

[58] Field of Search .................. 340/173 R, 173 RC; 307/238, 279; 357/24, 45

[56] References Cited

UNITED STATES PATENTS 3,763,480 10/1973 Weimer .................. 340/173 R

*Primary Examiner*—Terrell W. Fears
*Attorney, Agent, or Firm*—Alan H. MacPherson; Ronald J. Richbourg

[57] ABSTRACT

A charge coupled memory device is disclosed which comprises a plurality of CCD shift registers, input write circuitry, output read circuitry, and a plurality of charge comparison circuits, each of which are coupled between corresponding ones of the CCD shift registers. Each charge comparison circuit includes an active charge comparator device having a pair of field effect transistors that are cross-coupled to one another. Charge is applied from the output of the preceding shift register to an input of the charge comparison circuit, and the charge is compared with a reference charge developed from a reference signal. The charge comparison circuit provides complementary logic output signals that correspond to whether the input charge is greater or less than the reference charge. The charge comparison circuit is insensitive to voltage variations in the DC power supply and does not consume any DC power. The output logic signals are compatible with the logic levels of the external circuitry.

11 Claims, 4 Drawing Figures

PATENTED JUN 24 1975 SHEET 2 3,891,977

CHARGE COUPLED MEMORY DEVICE

BACKGROUND OF THE INVENTION

1. Field of the Invention

The invention relates to a charge coupled memory device and, more particularly, to such a memory device that includes a plurality of CCD shift registers and a charge comparison circuit.

2. Description of the Prior Art

The basic concept of charge coupled semiconductor devices is described in an article published in the Apr. 19, 1970 Bell System Technical Journal, page 587, entitled "Charge Coupled Semiconductor Devices" by W. S. Boyle and G. E. Smith. As described in that article, a charge coupled device consists of a metal-insulation-semiconductor (MIS) structure in which minority carriers are stored in a "spatially defined region," also called a "potential well" at the surface of the semiconductor material. The charge is moved along the surface by moving the potential minimum. A paper on page 593 of the same volume of the Bell System Technical Journal by Amelio, et al., entitled "Experimental Verification of the Charge Coupled Device Concept" described experiments carried out to demonstrate feasibility of the charge coupled device storage.

As discussed by Boyle and Smith, charge-coupled devices (hereinafter referred to as CCD) are potentially useful as shift registers, delay lines, and as imaging or display devices.

In CCD shift registers, charge is propagated through a series of gates and by a particular timing sequence of voltage applied to the several gates. Many shift registers are comprised of 1,024 bits of stored information. Thus, it is common for charge appearing at an input of a shift register to be transferred through 1,024 serial bit storage steps before it reaches the output of the register. The charge appearing at the output may then be applied again to the input of another register or applied to an output bus. In view of the length of the register and the many storage steps that occur between the input and the output of the register and the relatively small magnitude of charge that is applied to the input, it is not surprising that CCD shift registers are susceptible to problems. As can be expected, charge deteriorates as it passes through the register. For example, a deteriorated logic 1 becomes a logic 0 and thus, wrong information is supplied at the output. In another case, charge is normally generated within the substrate material thereby causing charge to appear at the register output which is interpreted as a logic 1. The problem in sensing low quantities of charge in CCD devices is compounded when the sensing occurs physically near the power supply sources for the CCD.

Attempts have been made to overcome the problem of charge deterioration in shift registers. For example, the concept of including a refresh cell at the output of a shift register to amplify charge is known. However, refresh cells, as conceptualized, are merely charge amplifiers which would simply amplify an absolute level of charge by a predetermined constant amount. Thus, the known charge refresh cells are very simple and crude devices, and do not really solve the problem of providing a constant quantity of charge representative of a normal logic 1 or logic 0 in a CCD shift register.

SUMMARY OF THE INVENTION

In accordance with this invention a charge coupled memory device is provided having input/output means, N CCD shift registers (wherein N is an integer from 1 to N) each having register input terminal means for receiving serial bits of data, and register output means for supplying serial bits of data from the shift registers; write terminal means, coupled between the input/output means and the register input means of a first one of the shift registers for writing data into the memory device; read terminal means coupled to the input/output means for reading data from the memory device; and, N charge comparison circuits, wherein each of N−1 of the circuits is uniquely coupled between the register output means of a corresponding one of the shift registers and the register input means of the next adjacent one of the shift registers, the Nth comparison circuit having an input terminal coupled to the output terminal means of the Nth shift register and having two output terminals for providing complementary output signals representative of the bits of data, wherein the first one of the two output terminals is coupled to said read terminal means of the memory device, and the second one of the two output terminals is coupled to both said write terminal means and said read terminal means so as to recirculate the serial bits of data through the shift registers, whereby the serial bits of data are recirculated through the N CCD shift registers at the same time the data is read from the memory device.

Each of the N charge comparison circuits comprises means for supplying a reference charge and a charge comparing means operative to compare the magnitude of an input charge with said reference charge and to develop an output signal if the input charge is greater than the reference charge, said output signal being a pulse of substantially constant magnitude over the pulse width.

DETAILED DESCRIPTION OF THE PREFERRED EMBODIMENT

Figure 1:
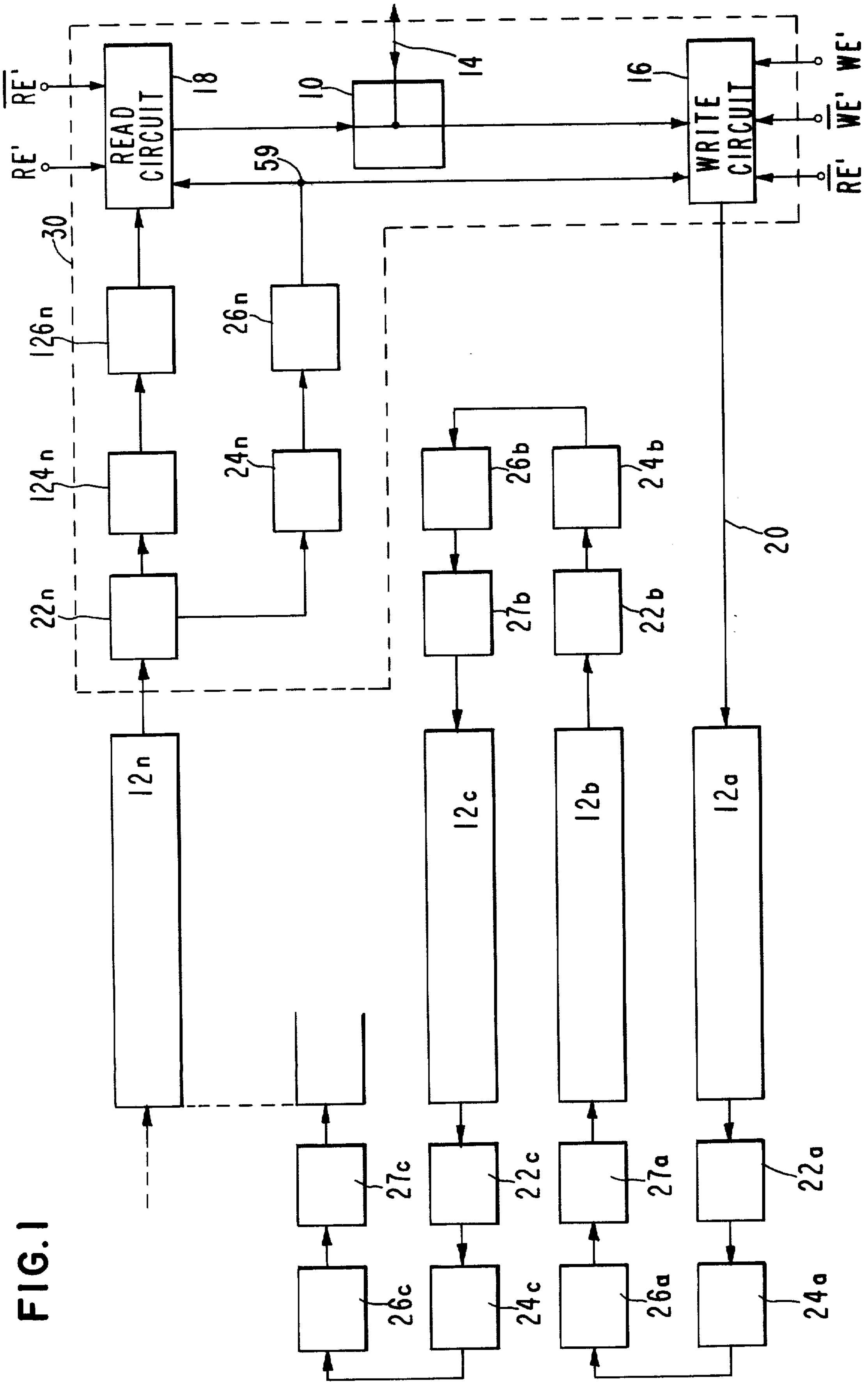
FIG. 1 illustrates an overall block diagram of the memory device of the present invention.

Referring now to the drawings, and in particular to FIG. 1, a block diagram of a charge coupled memory device constructed in accordance with the present invention is illustrated. The charge coupled memory device shown in FIG. 1 comprises a memory for a single bit of data for a multiple-bit byte memory, and a plurality of such memory devices are employed for constructing such a multiple-bit byte memory. For example, a 9-bit-byte memory employs 9 such memory devices as illustrated in FIG. 1.

The memory device illustrated in FIG. 1 includes an input-and-output stage 10 which is serially coupled to a plurality of CCD shift registers 12*a*, 12*b*, 12*c*, . . . 12*n*. Input data is supplied to the memory device by means of a line 14, and output data is retrieved from the memory by means of the same line 14. The input data line 14 is coupled to a write circuit 16, and to a read circuit 18. Control signals, which will be explained in greater detail hereinbelow, are supplied to control inputs of the write circuit 16. These control signals are designated $\overline{RE}'$, $\overline{WE}'$ and WE'; which signals are named "Not Read Enable Prime," "Not Write Enable Prime," and "Write Enable," respectively. Likewise, two control signals are supplied to the read circuit 18, which signals are designated RE' and $\overline{RE}'$ and are named "Read Enable Prime" and "Not Read Enable Prime," respectively. Additional control signals are supplied to the write circuit 16, the read circuit 18, and the constituent circuits of the memory device; which control signals will be explained in greater detail hereinbelow.

The output of the write circuit 16 is coupled to the input terminal of a first CCD shift register 12*a* by means of a line 20. The output terminal of the shift register 12*a* is coupled to the input of a charge comparison circuit 22*a*. Each charge comparison circuit (22*a*, 22*b*, 22*c*, . . . 22*n*) detects whether the quantity of charge applied to its input is a logic 1 or a logic 0 by comparing the charge to a reference charge, and then supplies an output signal commensurate with a logic 1 or logic 0. The output of the charge comparison circuit 22*a* is coupled to the input of an inverter circuit 24*a*, which functions to invert the logic 1 to a logic 0, and vice versa. The output of the inverter circuit 24*a* is coupled to the input of a line driver circuit 26*a*. The line driver circuit is employed for providing voltage levels that are compatible for interfacing with external circuits (not shown). The output of the line driver circuit 26*a* is coupled to the input of an interfacing circuit 27*a*. The interfacing circuit is employed for providing logic 1 or logic 0 voltage levels that are compatible for interfacing with the CCD shift registers. The output of the interfacing circuit 27*a* is coupled to the input of a second CCD shift register 12*b*. The additional CCD shift registers 12*c*, . . . 12*n*, with corresponding charge comparison circuit 22*b*, 22*c*, . . . 22*n*, inverter circuits 24*b*, 24*c*, . . . 24*n*, line driver circuits 26*b*, 26*c*, . . . 26*n*, and interfacing circuits 27*b*, 27*c*, . . . , are all arranged in a serpentine or snake-like pattern so as to provide maximum use of the semiconductor chip area. It is the purpose of each group of circuits coupled between the output of one shift register and the input of the subsequent shift register (e.g., circuits 22*a*, 24*a*, 26*a*, and 27*a*) to compare the magnitude of a packet of charge and to regenerate a new charge signal, which assures that possible charge degradation is overcome between subsequent shift registers within the memory device.

The output terminal of shift register 12*n* is coupled to the input of a charge comparison circuit 22*n*. Two output signals are supplied from charge comparison circuit 22*n*, which two signals are inverted in polarity as will be shown hereafter. A first of these two signals is coupled to the input of an inverter circuit 124*n*, and the second of these two signals is coupled to the input of an inverter circuit 24*n*. The output of the inverter 124*n* is coupled to the input of a line driver circuit 126*n*. The output of the inverter circuit 126*n* is coupled to an input of the read circuit 18. The output of the inverter circuit 24*n* is coupled to the input of a line driver circuit 26*n*. The output of the line driver circuit 26*n* is coupled to an input of the read circuit 18 and an input of the write circuit 16. It is the function of the inverter circuit 24*n* and the line driver circuit 26*n* to recirculate bits of data within the memory.

As will be shown in greater detail hereinbelow, an interfacing circuit 27*n* (not shown in FIG. 1) is disposed within the write circuit 16 to preform the same function as the circuits 27*a*, 27*b*, 27*c*, . . . .

CCD shift registers are well-known in the art and will not be explained in greater detail herein. However, reference is made to the above cited article by W. S. Boyle and G. E. Smith. Shift registers 12*a*, 12*b*, 12*c*, . . . 12*n* are all identical in structure. The input-and-output stage 10, the write circuit 16, the read circuit 18, charge comparison circuit 22*n*, inverter circuits 24*n* and 124*n*, and line driver circuits 26*n* and 126*n*, all of which are enclosed in FIG. 1 by dashed line 30, are illustrated in greater detail in FIG. 4. Charge comparison circuits 22*a*, 22*b*, 22*c*, . . . 22*n*; inverter circuits 24*a*, 24*b*, 24*c*, . . . 24*n*; line driver circuits 26*a*, 26*b*, 26*c*, . . . 26*n*; and, interfacing circuits 27*a*, 27*b*, 27*c*, . . . 27*n* are each respectively identical in structure. Likewise, the circuit 124*n* is identical in structure to the circuits 24*a*, 24*b*, 24*c*, . . . 24*n*; and, the circuit 126*n* is identical in structure to the circuits 26*a*, 26*b*, 26*c*, . . . 26*n*.

In operation, binary data in the form of logic 1's and logic 0's (commonly referred to as bits of data) are supplied serially on line 14. This data is routed through the write circuit 16 (depending upon the status of the control signals supplied to the circuit 16) to the input terminal of the shift register 12*a* by means of the line 20. Upon the application of timing signals supplied to the shift registers (not shown) data are routed through the serial string of shift registers 12*a*, 12*b*, 12*c*, . . . 12*n*. The magnitude of the individual bits of data is maintained at a proper level by means of the charge comparison circuits 22*a*, 22*b*, 22*c*, . . . 22*n*, in conjunction with the inverter circuits 24*a*, 24*b*, 24*c*, . . . 24*n*, the line driver circuits 26*a*, 26*b*, 26*c*, . . . 26*n*, and the interfacing circuits 27*a*, 27*b*, 27*c*, . . . .

Data is retrieved from the memory device by means of the read circuit 18 when the status of the control signals is set for data retrival. However, if data is stored in the memory device and is to be retained within the memory device for a period of time prior to retrival, the stored data is recirculated through the serial string of shift registers 12*a*, 12*b*, 12*c*, . . . 12*n* until retrival of the data is desired. Recirculation of the data within the memory is accomplished by means of the inverter circuit 24*n*, the line driver circuit 26*n*, and the status of the control signals applied to the memory device. This operation will be explained in greater detail hereinbelow.

In the description that follows, a transistor is denoted by the letter Q followed by a number, and the other types of components by an identifying letter, such as C for capacitor followed by a number. Nodal points within the circuits are designated solely by a number.

Figure 2:
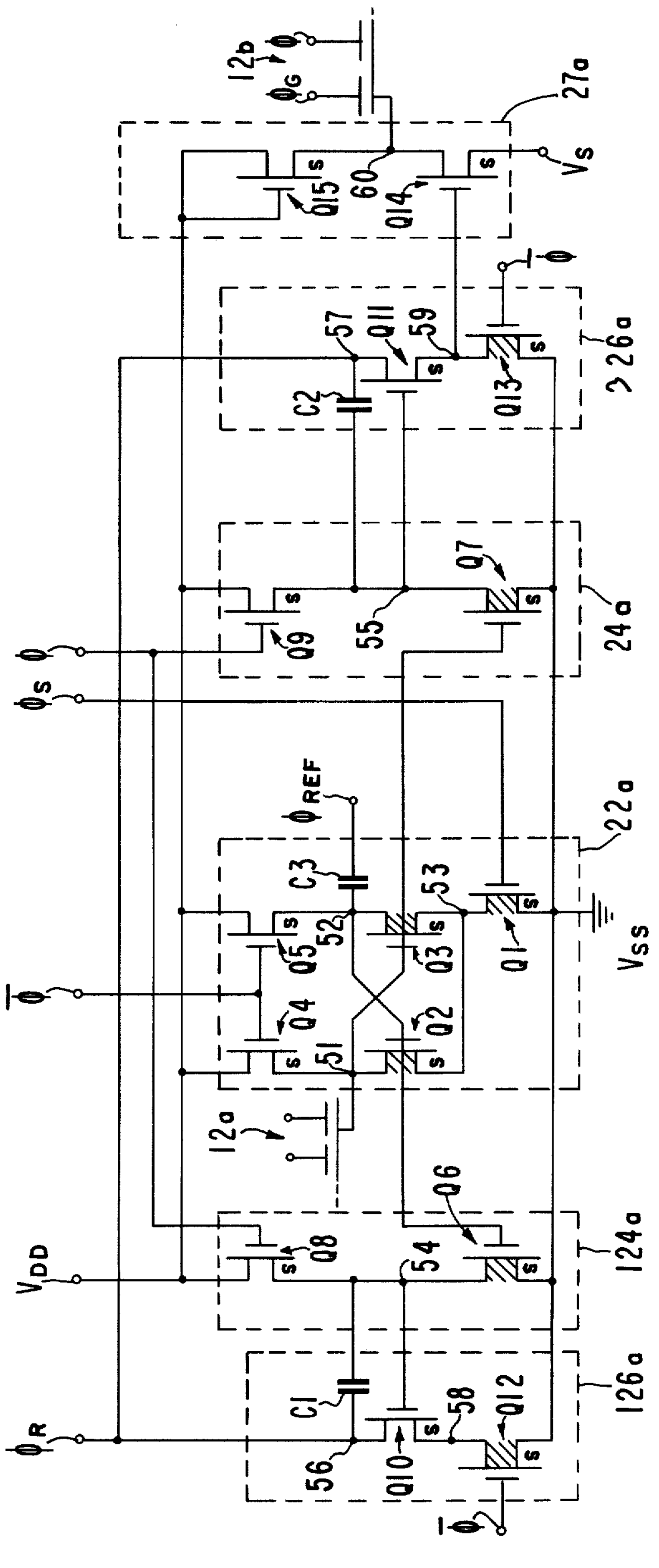
FIG. 2 is a detailed schematic diagram of the charge comparison circuit, an inverter circuit, a line driver circuit, and an interfacing circuit.
Figure 3:
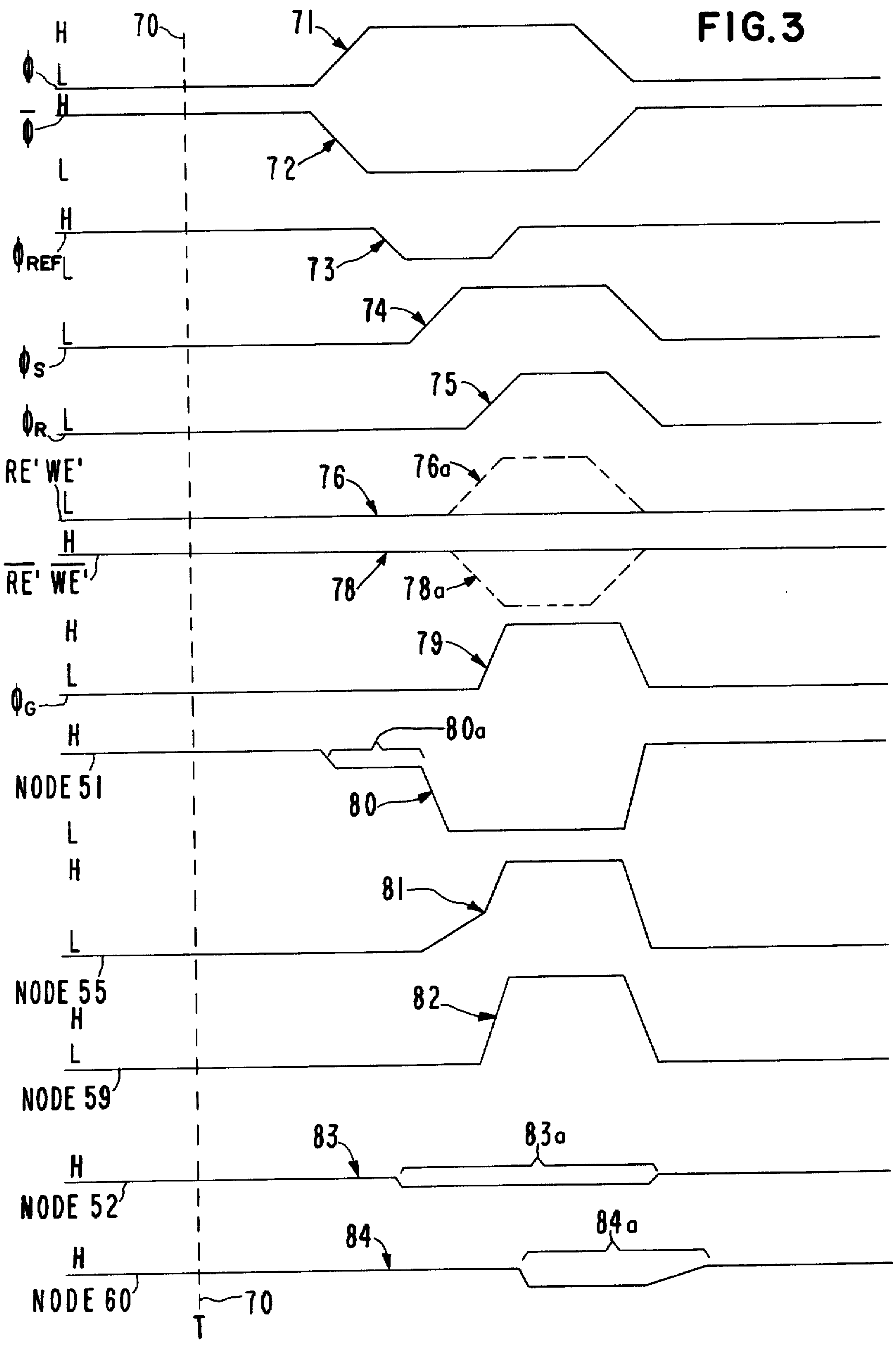
FIG. 3 is a timing diagram illustrating clock signals, control signals, and voltage levels on select nodes of the circuits shown in FIGS. 2 and 4.

Prior to describing the structure illustrated in FIG. 2, a brief description of the modes of operation and the control signals is provided herein to aid in understanding the description to follow. Some of the control and clock signals, as well as voltages appearing on some nodes within the circuit, are illustrated in FIG. 3 and will be explained in greater detail hereinbelow.

In the disclosed memory device employing the CCD shift registers, four modes of operation are available. The modes of operation include Recirculate Mode, Read Mode, Write Mode and Read-Modify-Write Mode. The desired mode of operation is dependent upon the states of particular external logic signals applied to the memory device. The external logic signals in the preferred embodiment have Transistor-Transistor Logic (TTL) voltage levels, are generated off the chip, and are not shown in the figures. These external logic signals are listed as follows:

| | |
|---|---|
| Not Read Enable | $(\overline{RE})$ |
| Not Write Enable | $(\overline{WE})$ |

Another external logic signal, which is a high-level clock, is listed as:

| | |
|---|---|
| Data Enable | (DE) |

Combinations of the off-chip generated logic signals are applied to logic interfacing and inverting amplifiers to produce the following control signals that are generated on the same chip as the memory device.

| | |
|---|---|
| Read Enable Prime | $(RE')$ |
| Not Read Enable Prime | $(\overline{RE'})$ |
| Write Enable Prime | $(WE')$ |
| Not Write Enable Prime | $(\overline{WE'})$ |

The circuit operation is also dependent upon certain clock signals which include:

| | |
|---|---|
| Phase | $(\Phi)$ |
| Not Phase | $(\overline{\Phi})$ |
| Phase R | $(\Phi R)$ |
| Phase S | $(\Phi S)$ |
| Phase G | $(\Phi G)$ |
| Phase Ref | $(\Phi ref)$. |

Phase and Not Phase are clocks which drive the CCD shift registers. These clocks are not necessarily symmetrical with each other. However Phase and Not Phase are approximately complementary waveforms with some specified skew. The control signals, the clock signals, and voltage levels appearing on select nodes of the circuits are illustrated in FIG. 3; and, will be explained in conjunction with the description below of the operation of the circuits shown in FIGS. 2 and 4. The control signals are generated with conventional logic circuits, which circuits are not shown or described herein.

The "half" cycle when Not Phase is high may be somewhat shorter than the half cycle when Phase is high or it may be significantly longer depending on the mode of operation and on the application of the circuit. Of particular importance is that no DC power is dissipated in this circuit during the period when Phase is low. Thus, this circuit provides an extremely low power standby period since the only power dissipated during standby is the dynamic power required to reset all the circuits and to transfer charge in the CCD elements.

Phase R, Phase S, Phase G and Phase Ref are on-chip generated clock signals. The circuitry employed generating these signals is conventional and is neither shown nor described herein. The voltages of the clock signals, except Phase Ref, swing approximately between the DC bias supply voltage (VDD) and circuit ground (VSS). In the preferred embodiment VDD is 12 volts positive. Phase Ref swings between plus 5 and 0 volts.

The exact dependency of each of the modes of operation upon the states of the earlier described logic signals is as follows. If a Recirculate Mode is desired, Data Enable may be either high or low; but, if it is high, then Not Read Enable and Not Write Enable must also be high. If Data Enable is low the states of Not Read Enable and Not Write Enable do not matter. If one of the other modes or cycles is desired, then Data Enable must be high.

The terms "high" and "low" refer to the relative values of the bistable voltage swing of the respective logic levels. The word "not" is understood to refer to the complement of the logic level or clock signal that follows the word. The words "Not" and "Bar" may be used interchangeably.

A Read Mode cycle is executed if Data Enable, and Not Write Enable are high and if Not Read Enable is low.

A Write Mode cycle is executed if Data Enable and Not Read Enable are high and if Not Write Enable is low.

A Read-Modify-Write Mode cycle is executed if Data Enable is high, and if Not Read Enable and Not Write Enable are low initially. During the last protion of the cycle, however, Not Read Enable must go high so as to provide a command to switch the circuit from the read-out state to a write-in state.

As previously stated, the three external logic signals, Data Enable, Not Write Enable and Not Read Enable, are fed into logic interfacing and inverting amplifiers (not shown) to produce control signals Read Enable Prime, Not Read Enable Prime, Write Enable Prime, and Not Write Enable Prime, which are designated generically as on-chip control signals. The on-chip control signals are always reset to define a Recirculate Mode cycle during the Not Phase "half" cycle.

Referring to FIG. 2, the transistors Q1, Q2, Q3, Q4 and Q5 comprise the charge comparison circuit 22*a*. Circuit 22*a* is identical in structure to all of the novel charge comparison circuits 22*b*, 22*c*, . . . 22*n*, of this invention. All transistors employed within the circuitry illustrated in this application are N channel devices, and the CCD shift registers are fabricated within a P type semiconductor material. Thus, a logic 1 comprises a packet of electrons, which will also be referred to herein as a packet of charge. The signal at the output of the CCD shift register 12*a* is applied at node 51 of the comparison circuit. A portion of the CCD shift register 12*a* is shown coupled to the node 51. Node 51 is the input terminal to the charge comparison circuit 22*a*, and also is connected in common to the drain terminal of the transistor Q2 and the source terminal of the transistor Q4, and to the gate terminal of the transistor Q3. The conductor carrying the Not Phase clock signal is applied to the commonly connected gates of the transistors Q4 and Q5. The drain terminals of the transistors Q4 and Q5 are connected in common to the supply voltage, VDD. The gate electrode of the transistor Q2 is coupled to the drain electrode of the transistor Q3 and the source electrode of the transistor Q5 at a reference node 52. Also, node 52 is coupled to the Phase Ref clock signal through a charge capacitor C3. Current flows through the transistors Q4 and Q5 so as to charge the nodes 51 and 52, respectively, to potentials that are approximately equal to the voltage VDD. The potentials on the nodes 51 and 52 differ from the potential of VVD only by the voltage drop across the gate-to-source terminals of the respective transistors Q4 and Q5, which drop is generally less than 0.5 volts.

The transistors Q1, Q2, and Q3 are implanted with an impurity, such as boron so as to provide increased threshold voltages of approximately 1.4 volts when a minus 5 volt DC voltage is applied to the substrate. Boron is the preferred impurity, and the transistors which have been implanted are indicated by cross-hatching in the drawings. The source terminals of the transistors Q2 and Q3 are connected together and also coupled in common with the drain terminal of the transistor Q1 at a node 53. The source terminal of the transistor Q1 is coupled to circuit ground potential, VSS; and, the gate terminal of the transistor Q1 is coupled to the Phase S clock signal.

The Phase S clock signal is initially at a low level, thus the transistor Q1 is turned off and the node 53 is charged to a threshold voltage below that of the nodes 51 and 52.

The charge comparison circuit **22*a* may be constructed in accordance with a charge sensing circuit disclosed in copending patent application Ser. No. 448,771 entitled "Charge Sensing Arrangement" by G. F. Amelio and K. C. Gunsagar, filed on Mar. 6, 1974, and assigned to the same assignee as the present application. The charge comparison circuit 22*a*** disclosed herein operates by sensing disparities in charge, whereas the circuit in the above-cited copending patent application operates by sensing disparities in voltage generated as a function of charge applied to the input terminals.

Two symmetrical inverter circuits **24*a* and 124*a* are connected to output terminals of the charge comparison circuit 22*a*. Each of the two inverter circuits 124*a* and 24*a* comprise transistors Q6 and Q8, and Q7 and Q9, respectively. The inverter circuits 124*a* and 24*a* function to invert the output signal from the charge comparison circuit 22*a*. Two symmetrical line driver circuits 126*a* and 26*a* are electrically coupled to the output of the respective inverter circuits 124*a* and 24*a*. Each of the two line driver circuits 126*a* and 26*a* comprise transistors Q10 and Q12 and capacitor C1, and transistors Q11 and Q13 and capacitor C2, respectively. The circuits 124*a* and 126*a* are not used for the charge refresh operation between the output of a shift register and the input of a subsequent shift register. However, these circuits are used for the circuitry employed for the Recirculate Mode cycle of operation to be explained in greater detail hereinbelow. The circuits 124*a* and 126*a* and similar circuits concomitant to comparison circuits 22*b*, 22*c*, . . . 22*n*-1** are employed to balance the load on the comparison circuits, which assures proper operation of the comparison circuits.

The gate terminal of the transistor Q2, which is coupled to the node 52, is coupled to the gate terminal Q6 within the inverter circuit **124*a*. The source terminal of the transistor Q6 is coupled to the circuit ground potential, VSS. The drain terminal of the transistor Q6 is coupled to the source terminal of the transistor Q8 at a node 54.** The drain terminal of the transistor Q8 is coupled to the voltage source VDD. The gate terminal of the transistor Q8 is coupled to the Phase clock signal.

The node 54 is coupled to the gate terminal of the transistor Q10 within the line driver circuit **126*a*. The source terminal of the transistor Q10 is coupled to the drain terminal of the transistor Q12 at a node 58, and the gate terminal of the transistor Q12 is coupled to the Not Phase clock signal. The node 54 within the inverter circuit 124*a* is coupled to the drain terminal of the transistor Q10 at a node 56 within the line driver circuit 126*a* through a capacitor C1. The drain terminal of the transistor Q10 is coupled to the Phase R clock signal. The transistor Q6 within the inverter circuit 124*a* and the transistor Q12 within the line driver circuit 126*a*** are both implanted with an impurity to change the threshold voltage relative to other transistors in the circuit without such implantation.

The gate terminal of the transistor Q3, which is also coupled to the node 51, is coupled to the gate terminal of the transistor Q7 within the inverter circuit **24*a*. The source terminal of the transistor Q7 is coupled to the circuit ground potential VSS, and the drain terminal thereof is coupled to the source terminal of the transistor Q9 at a node 55.** The drain terminal of the transistor Q9 is coupled to the voltage source VDD, and the gate terminal thereof is coupled to the Phase clock signal.

The node 55 within the inverter circuit **24*a* is coupled to the gate terminal of the transistor Q11 within the line driver circuit 26*a*. The source terminal of the transistor Q11 is coupled to the drain terminal of the transistor Q13 at a node 59. The source terminal of the transistor Q13 is coupled to circuit ground potential VSS, and the gate terminal thereof is coupled to the Not Phase clock signal. The capacitor C2 is coupled between the node 55 within the inverter circuit 24*a* and the drain terminal of the transistor Q11 at a node 57 within the line driver circuit 26*a*.** The drain terminal of the transistor Q11 is coupled to the Phase R clock signal.

The node 59 within the line driver circuit **26*a* is coupled to the gate terminal of a transistor Q14 within the interfacing circuit 27*a*. The source terminal of the transistor Q14 is coupled to a reference supply voltage VS, and the drain terminal of Q14 is coupled to the source terminal of a transistor Q15 at a node 60. The drain and gate terminals of the transistor Q15 are commonly connected to the voltage source VDD so that transistor Q15 normally conducts. The CCD shift register 12*b* is coupled to the node 60, and only a portion of the shift register 12*a*** is illustrated for simplification of the drawings.

Prior to describing the operation of the circuit shown in FIG. 2, reference is made to FIG. 3 wherein waveforms are shown to depict the relative time relationship between the clock signals, the control signals, and the resulting voltages on select nodes of the circuit shown in FIG. 2. The vertical dashed line represents the initial time T. Waveform 71 depicts the Phase (Φ) clock signal, and waveform 72 depicts the Not Phase ($\overline{\Phi}$) clock signal. As may be seen the Phase and Not Phase clock signals are complementary, however some skew is allowable. Waveform 73 depicts the Phase Ref (Φref) clock signal. The Phase Ref clock signal is low within the time frame that the Phase clock signal (waveform 71) is high. Waveforms 74 and 75 depict the Phase S (ΦS) and the Phase R (ΦR) clock signals, respectively. The Phase R clock signal is high during the time frame that the Phase S (waveform 74) is high.

During the Recirculate Mode of operation, the Read Enable Prime (RE') and the Write Enable Prime (WE') signals are at a low level. These control signals are depicted by a combined waveform 76. Also, the Not Read Enable Prime ($\overline{RE}'$) and the Not Write Enable Prime ($\overline{WE}'$) control signals are at a high level and are depicted by a combined waveform 78. During the Read Mode of operation, the Read Enable Prime (RE') control signal is high during a brief period of time as illustrated by portion 76a of waveform 76. Likewise, the Not Read Enable Prime ($\overline{RE}$') control signal is low during the same period of time as illustrated by portion 78a of waveform 78. The Write Enable Prime (WE') and the Not Write Enable Prime ($\overline{WE}$') control signals do not change during the Read Mode of operation and remain at a constant level as depicted by waveforms 76 and 78, respectively. During the Write Mode of operation, the Write Enable Prime (WE') control signal is at a high level during a brief period of time as illustrated by portion 76a of waveform 76. Likewise, the Not Write Enable Prime ($\overline{WE}$') control signal is low during the same period of time as depicted by portion 78a of waveform 78. The Read Enable Prime (RE') and the Not Read Enable Prime ($\overline{RE}$') control signals remain at a constant level during the Write Mode of operation as depicted by the waveforms 76 and 78, respectively. The Phase G (Φ G) clock signal is depicted by waveform 79. The Phase G clock signal is high within a time frame that the Phase S (waveform 74) and Phase R (waveform 75) are high.

The voltage appearing on the node 51 is depicted by waveform 80. The voltages appearing on the nodes 55 and 59 are depicted by waveforms 81 and 82, respectively. The voltage appearing on the node 52 is depicted by a waveform 83. The voltage appearing on the node 60 is depicted by waveform 84.

A charge will not be transferred to the shift register 12b until the voltage applied to the first gate of the shift register (i.e., the Phase G clock signal) is higher than the voltage applied to the source terminal of the shift register. Accordingly, when the waveform 84 drops in amplitude, charge will be transferred to the shift register 12b. Accordingly, a charge will transfer to the shift register during the time interval represented by portion 84a of the waveform 84.

In the description below of the operation of the circuit shown in FIG. 2, reference is also made to FIGS. 1 and 3. The following description applies to all modes of operation.

It is assumed for the present discussion that data have been previously written into the memory device. Data cannot be stored in the memory device in a static form, but rather must be recirculated through the CCD shift registers 12a, 12b, 12c, . . . 12n because the lifetime of charge in CCD cells is limited due to normal extraneous charge generation within the substrate material. Normally, bits of data are serially applied to the input node 51 of the charge comparison circuit 22a from the shift register 12a. It is further assumed for the present discussion that a single logic 1 bit of data is applied to the node 51 from the shift register 12a, which comprises a packet of charge or electrons.

The initial condition of the control and clock signals is as shown at the time T in FIG. 3. The first event that occurs is that, at some time after T, the Not Phase clock signal (waveform 72) makes a negative transition from its initially high state. During this transition node 51 begins to discharge slightly, as shown by portion 80a of the waveform 80. If the transistors Q4 and Q5 were not initially turned off, the negative transition of the Not Phase clock signal assures that these transistors are turned off. After this negative transition, the nodes 51 and 52 are floating due to the fact that they are isolated from other portions of the circuit.

At some time during the negative transition of the Not Phase clock signal, the logic 1 bit of data, or packet of charge, from the output of the shift register 12a is applied to the input node 51. In addition to causing the nodes 51 and 52 to float as the Not Phase clock signal drops, this negative transition causes the packet of charge to be transferred to the node 51 from the shift register 12a. As soon as the Not Phase clock signal reaches a low level, the Phase Ref clock signal makes a negative transition from an initial high level to a low level, which applies a negative reference charge to the node 52 (portion 83a of the waveform 83). The amount of charge applied to the reference node 52 is chosen to be intermediate between possible maximum and minimum charge levels which may be applied to the input node 51 of the charge comparison circuit 22a, and balanced by the relative loads on the nodes 51 and 52. The charge associated with the Phase Ref clock signal, which charge appears on the node 52, is referred to as the comparison charge for it is this charge that is compared with the charge appearing at the input node 51.

After the packet of charge has been applied from the shift register 12a, the voltage appearing on the node 51 is reduced in value as a result of the negative charge from the electrons within the packet of charge. If the amount of charge within the packet is greater than the amount of the negative reference charge developed across capacitor C3 in response to the Phase Ref clock signal, then the voltage on the node 51 is lower than the voltage on the node 52. Because of the unique differential sensing feature of the charge comparison circuitry, differences in charge which correspond to differences in voltage are only slightly greater than possible mismatches in the threshold voltages of the transistors Q2 and Q3; and, these differences are accurately sensed by the circuit. For example, disparities of input charges corresponding to disparities of voltages approximately equal to 200mv can be accurately sensed.

The next event occurs when Phase S goes high after Not Phase and Phase Ref are low. As Phase S goes high, Q1 is turned on pulling node 53 toward VSS. As node 53 is pulled down, the higher of the two nodes 51 or 52 turns on either transistor Q3 or Q2, respectively. In this case, since a logic 1 was present on the input node 51, node 52 has the higher voltage. Accordingly, Q2 turns on which pulls node 51 down to ground potential; thereby discharging node 51 and insuring that transistor Q3 does not turn on as node 53 continues to decrease to ground potential. If there is very little difference in charge on the nodes 51 and 52, the incorrect transistor may begin to conduct but will not lower its drain voltage as much as will that of the correct transistor.

With the lowering of the voltage on node 51, the transistor Q7 in the inverter circuit 24a turns off, thereby causing the voltage on the node 55 to rise. Charge appears across capacitor C2 as the node 55 rises in voltage. Although the Phase clock signal went high when the Not Phase clock signal went low, there was no appreciable voltage change at the node 55 since the node 51 was also high, and since the nodes 54 and 55 were low due to the fact that the transistors Q6 and Q7 were initially turned on. As the voltage on the node 55 rises, transistor Q11 turns on.

Next, the Phase R clock signal goes high and the voltage on the node 55 goes higher, which causes a voltage to build up on the node 59 through the conducting transistor Q11. The voltage on the node 59 is coupled back to the node 55 at the gate of the transistor Q11 through a relatively high source-to-gate capacitance of the transistor Q11. Because of this boot-strap source-follower configuration, the Phase R clock signal is effectively coupled to the gate of the transistor Q11. Accordingly, transistor Q11 conducts during the entire time that the Phase R clock signal rises thereby causing the voltage on the node 55 to rise ahead of that on the node 59. Consequently, the voltage on the node 55 is higher than that of the bias voltage VDD. This enables the output voltage on the node 59 to be equal in magnitude to that of VDD, without any diminishing threshold voltage drop across the transistor Q11, and maximizes the swing of the output voltage on the node 59.

Under the conditions stated above, node 59 is at a high voltage level (logic 1) and the voltage on the complementary charge comparison circuit output node 58 is at a low voltage level (logic 0). Since the reference node 52 is at a higher level than the node 51 after the application of the logic 1 bit of data and the Phase Ref clock signal, the transistor Q2 is turned on. Transistor Q6 is also turned on since node 52 is connected to the base of Q6. Accordingly, node 54 is held at ground potential, or VSS, and the transistor Q10 remains in an off condition. Without voltage applied across the plates of the capacitor C1, no conduction path is provided from node 54 to node 56. The subsequent event of the Phase R clock signal going high does not affect the voltage levels at either of the nodes 54 or 58 since the transistor Q10 is turned off. Thus, the node 58 remains at ground potential. In accordance with the above-described operation, data received from the shift register 12*a* has been sensed, amplified, and is provided in complementary form on the nodes 58 and 59.

Thus, a logic 1 in the shift register 12*n* causes the node 59 within the line driver circuit 24*a* to go to a high level, thereby turning on the transistor Q14. The voltage level of the Phase G clock signal goes high shortly before that of the Phase R clock signal. Thus, when the node 60 goes low in response to the node 59 being high, charge flows into the shift register 12*a* under the input gates (Phase G and Phase).

If no charge, or charge insufficient to represent a logic 1, is present at the input node 51, then the node 59 remains at a low level. As stated hereinabove, the transistor Q15 is always in conduction since the gate and drain terminals thereof are both coupled to the voltage supply VDD. Accordingly, the node 60 remains at a high level just below the threshold level of the CCD input gate (Phase G gate) of the shift register 12*b*. If however, the VVD voltage level and the voltage level on the subsequent gate within the shift register 12*a* (Phase gate) are nearly equal, some subthreshold charge accumulates under the Phase G gate of the shift register 12*b*. This situation causes a "wet zero" to be propagated through the shift register 12*b*. A "wet zero" is a logic zero which contains a minimum amount of charge intentionally provided for charge dissipation that occurs from defects in the substrate material.

As the Not Phase clock signal begins to go high the Phase G, Phase R and Phase S clock signals are pulled low in that sequence. Thus, most of the charge at the node 60 is effectively isolated under the Phase gate in the shift register 12*b*.

The Not Phase clock signal is applied to the gates of the transistors Q12 and Q13 and to the gate terminals of the transistors Q4 and Q5. After the Not Phase clock signal goes high, all nodes in the circuit are reset to an initial condition at time equals T. The transistors Q12 and Q13, which are turned on in response to the Not Phase clock signal, insure that the nodes 58 and 59 are pulled down to the VSS potential so as to set up initial conditions for the subsequent bit of data. If these nodes are pulled low too rapidly, then a zero might be inadvertently transferred into the shift register 12*b* by the node 60 going to a high level before the Phase G clock signal drops to a low level.

Figure 4:
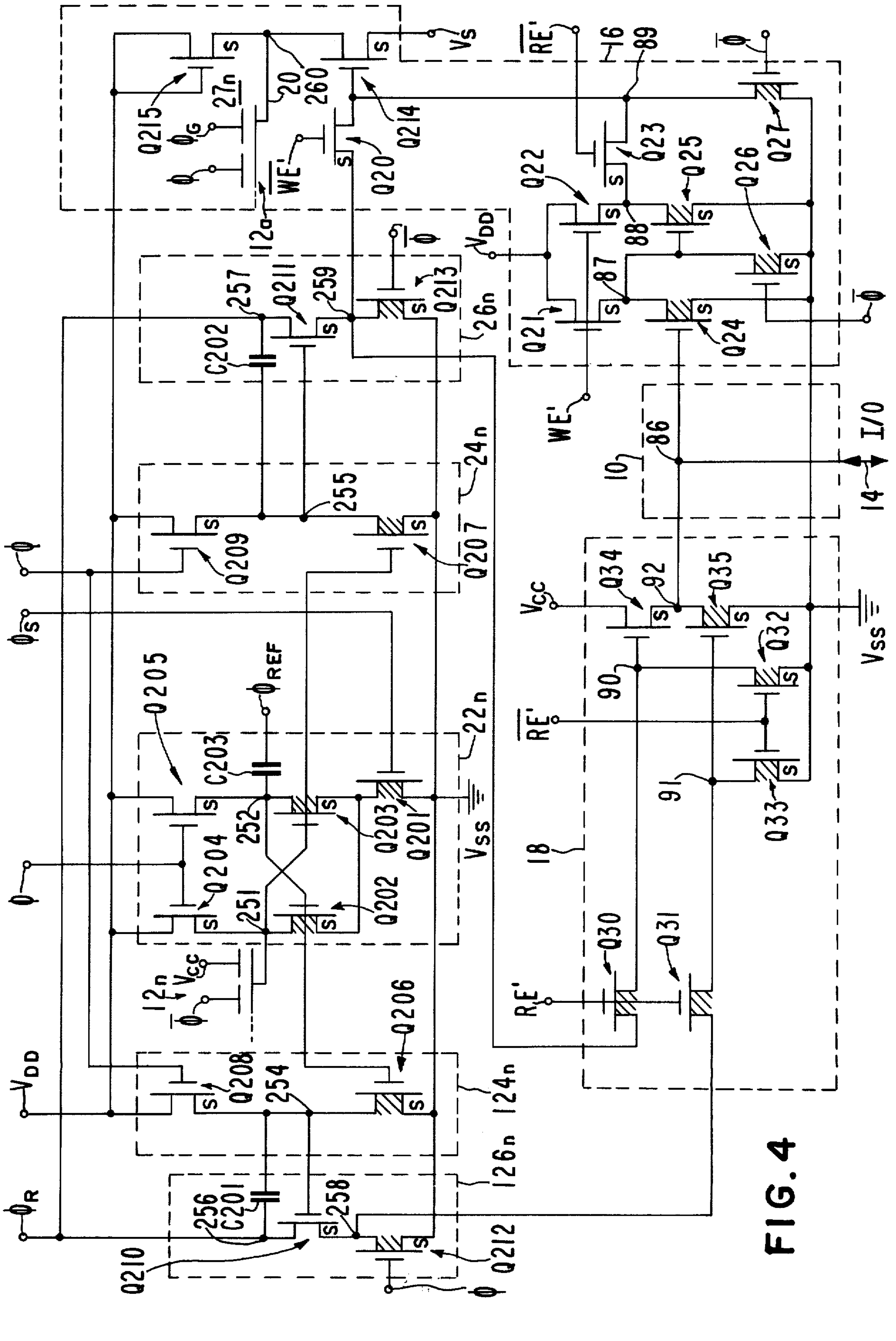
FIG. 4 is a detailed schematic diagram of the circuit shown in FIG. 2 further including the input-and-output stage, the write circuit, and the read circuit of the memory device.

Referring now to FIG. 4, the portion of the memory device shown in FIG. 1 and enclosed within the dashed line 30 is illustrated in greater detail. The charge comparison circuit 22*n*, the inverter circuits 24*n* and 124*n*, and the line driver circuits 26*n* and 126*n* are identical in structure and operation to the corresponding circuits shown in FIG. 2 and described above. The reference numerals employed above in reference to FIG. 2 depict corresponding components in FIG. 4 with an increased value of 200. Likewise, interfacing circuit 27*n* comprises transistors Q214 and Q215, which correspond to the transistors Q14 and Q15, respectively, of circuit 27*a* described above. The output terminal of the CCD shift register 12*n* is coupled to the input node 251 of the charge comparison circuit 22*n*; and, the input terminal of the CCD shift register 12*a* is coupled to the node 260 in the circuit 27*n* by means of the line 20.

Within the write circuit 16, a transistor Q20 is coupled to node 259 within the circuit 26*n*, and the drain terminal thereof is coupled to the gate terminal of the transistor Q214 in the circuit 27*n*. The gate terminal of the transistor Q20 is coupled to the Not Write Enable Prime ($\overline{WE}'$) control signal. The write circuit 16 further comprises transistors Q21, Q22, Q23, Q24, Q25, Q26 and Q27, wherein the transistors Q24 through Q27 are implanted with an impurity (such as boron) to change the threshold voltage with respect to other transistors not similarly implanted.

The input-and-output data line 14 is coupled to the input-and-output stage 10 at a node 86, which node is coupled to the gate terminal of the transistor Q24. The source terminal of the transistor Q24 is coupled to ground potential, and the drain terminal thereof is coupled to the source terminal of the transistor Q21 at a node 87. The gate terminal of each of the transistors Q21 and Q22 is coupled to the Write Enable Prime (WE') control signal. The drain terminal of each of the transistors Q21 and Q22 is coupled to the supply voltage VDD. The source terminal of the transistor Q22 is coupled to the drain terminal of the transistor Q25 at a node 88. The source terminal of the transistor Q25 is coupled to ground potential, and the gate terminal thereof is coupled to the node 87. The drain terminal of the transistor Q26 is coupled to the node 87, and the source terminal thereof is coupled to ground potential, VSS. The gate terminal of the transistor Q26 is coupled to the Not Phase clock signal.

The source terminal of the transistor Q23 is coupled to the node 88, and the drain terminal thereof is coupled to the gate terminal of the transistor Q214 and to the drain terminal of the transistor Q27 at a node 89. The gate terminal of the transistor Q23 is coupled to the Not Read Enable Prime ($\overline{RE}'$) control signal. The source terminal of the transistor Q27 is coupled to ground potential, VSS, and the gate terminal thereof is coupled to the Not Phase clock signal. It is the function of the transistor Q27 to reset the write circuit 16 in response to a high level of the Not Phase clock signal.

The read circuit 18 comprises transistors Q30, Q31, Q32, Q33, Q34 and Q35, wherein transistors Q30 through Q33, and Q35 are implanted with an impurity (such as boron) to change the threshold voltage thereof relative to other transistors not similarly implanted.

The node 259 within the line driver circuit **26*n* is coupled to the source terminal of the transistor Q30, and the node 258 within the line driver circuit 126*n* is coupled to the source terminal of the transistor Q31. The gate terminal of each of the transistors Q30 and Q31 is coupled to the Read Enable Prime (RE') control signal. The drain terminal of the transistor Q30 is coupled to the gate terminal of the transistor Q34 and the drain terminal of the transistor Q32 at a node 90. Similarly, the drain terminal of the transistor Q31 is coupled to the gate terminal of the transistor Q35 and the drain terminal of the transistor Q33 at a node 91. The gate terminal of each of the transistors Q32 and Q33 is coupled to the Not Read Enable Prime ($\overline{RE}'$) control signal, and the source terminals thereof are coupled to ground potential, VSS. The drain terminal of the transistor Q34 is coupled to a supply voltage VCC, and the source terminal thereof is coupled to the drain terminal of the transistor Q35 at a node 92. The node 92 is coupled to the node 86 within the input-and-output stage 10. The source terminal of the transistor Q35** is coupled to ground potential, VSS.

Accordingly, depending upon whether transistors Q19, or Q18, or neither conducts the output voltage on the node 62 (or line 14) will either be at VCC, or ground potential, or floating respectively. In the preferred embodiment VCC is 5 volts and is maintained within plus or minus 5% of this value.

The Write Mode cycle of operation for the circuit shown in FIG. 4 will now be described. It is the purpose of the Write Mode cycle to write serial bits of data into the memory device, which data are serially supplied on the line 14 to the node 86 from external circuitry (not shown).

The Write Mode cycle has substantially the same timing signals as that shown in FIG. 3. However, as pointed out hereinabove, the Write Enable Prime (WE') control signal (waveform 76) is high during a brief period of time as illustrated by the portion **76*a*. Likewise, the Not Write Enable Prime ($\overline{WE}'$) control signal is low during the same period of time as illustrated by the portion 78*a* of the waveform 78. The Read Enable Prime (RE') control signal remains low throughout the Write Mode cycle of operation, and the Not Read Enable Prime ($\overline{RE}'$) control signal remains high during the same cycle of operation. Since the Not Read Enable Prime ($\overline{RE}'$) control signal remains high during the Write Mode cycle, the transistors Q32 and Q33 conduct, thereby applying ground potential VSS to the nodes 90 and 91, respectively. This deactivates the Read Circuit 18** during the Write Mode cycle of operation.

The high state of the Not Read Enable Prime ($\overline{RE}'$) control signal turns on the transistor Q23, which provides a conduction path between the nodes 88 and 89. In addition, as the Not Write Enable Prime ($\overline{WE}'$) control signal goes low, the transistor Q20 turns off, which interrupts the conduction path between the node 259 and the gate terminal of the transistor Q214. However, the complementary Write Enable Prime (WE') control signal goes high and turns on the transistors Q21 and Q22, which causes the DC bias voltage VDD to be applied at the nodes 87 and 88. This activates the Write TTL interfacing inverters (transistors) Q24 and Q25. The transistors Q24 and Q25 amplify and shift the level of the TTL information (serial bits of data) appearing from the external circuitry at the input node 86, thus providing a driving signal on the node 89. If the node 89 is higher than the VS potential (approximately 7.5 volts) applied to the source terminal of the transistor Q20, this transistor is turned on and a logic 1 bit of data is applied through the Phase G gate at the input of the shift register **12*a*. Thus, a logic 1 bit of data is written into the shift register 12*a* in response to a high level signal applied at the node 86 via the line 14 from the external circuitry. On the other hand, if the node 89 is lower than the VS potential, no signal is applied to the input of the register 12*a*. In this instance, a logic 0 is written into the shift register 12*a* in response to a low level signal applied at the node 86**.

The Read Mode cycle of operation for the circuit shown in FIG. 4 will now be described. It is assumed that data are stored within the series of shift registers **12*a*, 12*b*, 12*c*, . . . 12*n*. It is therefore the purpose of the Read Mode cycle to retreive this data serially from the plurality of series-connected shift registers. The data appear at the node 86 from the read circuit 18, and are conveyed to external circuitry (not shown) by means of the line 14**.

The Read Mode cycle has substantially the same timing signals as that shown in FIG. 3. However, as pointed out hereinabove, the Read Enable Prime (RE') control signal (waveform 76) is high during a brief period of time as illustrated by the portion **76*a*. Likewise, the Not Read Enable Prime ($\overline{RE}'$) control signal is low during the same period of time as illustrated by the portion 78*a* of the waveform 78. The Write Enable Prime (WE') control signal remains low throughout the Read Mode cycle of operation, and the Not Write Enable Prime ($\overline{WE}'$) control signal remains high during the same cycle of operation. After time equals T, and prior to the time that the Phase and Not Phase clock signals change state, (i.e., the Phase clock signal makes a positive transition) the external Data Enable logic signal must go high and the Read Enable logic signal must go low. The external logic circuitry insures that the Not Read Enable Prime ($\overline{RE}'$) control signal will be low and that the Read Enable Prime (RE') control signal will be high before the Phase R clock signal makes a positive transition (compare the portions 76*a* and 78*a* with the waveform 75 in FIG. 3**).

Either the transistor Q30 or the transistor Q31 (both within the read circuit 18) conducts depending upon whether a logic 1 or a logic 0, respectively, was present at the node 251 within the circuit **22*n*. The transistors Q30 and Q31 are arranged in a push-pull configuration, and one of these transistors must conduct to apply VSS or VCC, respectively, to the node 86. In the description hereinabove of FIG. 2, it was shown that the application of a logic 1 bit of data to the node 51 produced a high voltage at the node 59 within the circuit 26*a* and a low level voltage at the node 58 within the circuit 126*a*. Under similar conditions in the circuit of FIG. 4, when the Read Enable Prime (RE') control signal is high, the transistor Q34 is turned on in response to a high level voltage on the node 259 which is transferred via the transistor Q30 to the gate terminal of the transistor Q34. Consequently, the VCC voltage is applied to the node 86 by means of the conducting transistor Q34. The high level voltage appearing on the node 86 is conveyed to the external circuitry by means of the line 14, and represents a logic 1 bit of data. When the Not Read Enable Prime (RE') control signal is at a high level, transistors Q32 and Q33 are turned on thereby grounding the nodes 90 and 91**, respectively.

When the Not Read Enable Prime ($\overline{RE}'$) control signal goes to a low level (portion 78*a* of the waveform 78), the transistor Q23 in the Write circuit 16 is turned off. Thus, information is prevented from being written into the register 12*a* by the turned-off transistor Q23. As described above, the logic 1 bit of information (which was manifested by a high-level voltage on the node 259) is transferred into the shift register 12*a* through the transistors Q214 and Q215.

The Recirculate Mode cycle of operation will now be described. It is the purpose of this mode to recirculate the serial bits of data through the CCD shift registers 12*a*, 12*b*, 12*c*, . . . 12*n*, since the bits of data must be stored dynamically in a charge coupled memory device. The timing diagram for the Recirculate Mode is illustrated in FIG. 3. The Read Enable Prime (RE') and the Write Enable Prime (WE') control signals do not change from a low-level state (waveform 76). Likewise, the Not Read Enable Prime ($\overline{RE}'$) and the Not Write Enable Prime ($\overline{WE}'$) control signals (waveform 78) do not change from a high-level state during the Recirculate Mode. The clock signals applied to the circuit shown in FIG. 4 during the Recirculate Mode cycle are as depicted by the waveforms 71 through 75 and the waveform 79.

Bits of data are applied at the node 251 from the CCD shift register, and these bits of data are manifested by high and low voltage levels at the node 259 as described hereinabove. The transistor Q20 is turned on in response to the high-level state of the Not Write Enable Prime ($\overline{WE}'$) control signal applied to the gate terminal of Q20. Therefore, the bits of data that are applied at the node 251 are transferred into the CCD shift register 12*a*, thereby completing a recirculation of data from the end of the series string of CCD shift register (output terminal of register 12*n*) to the beginning of this series string (input terminal of register 12*a*).

Since the Not Read Enable Prime ($\overline{RE}'$) control signal is high during the Recirculate Mode, the transistor Q23 is conducting. Thus, a voltage appears on the node 88 that follows the voltage on the node 259. However, since the Write Enable Prime (WE') control signal is low during the Recirculate Mode, the transistors Q21, Q25 and Q26 are turned off. Accordingly, the node 86 is not influenced by the potential appearing on the node 88.

The Read-Modify-Write Mode cycle of operation for the circuit shown in FIG. 2 will now be described. For the present discussion, it is assumed that data are stored within the series of shift registers 12*a*, 12*b*, 12*c*, . . . 12*n*. It is the purpose of the Read-Modify-Write cycle to read the data within the memory device and modify this data by writing new data where desired.

The timing signals as shown in FIG. 3 are substantially the same for this Mode of operation. However, the initialization of the external logic signals for this cycle of operation has Data Enable (DE) making a positive transition, Not Read Enable ($\overline{RE}$) making a negative transition and Not Write Enable ($\overline{WE}$) making a negative transition. As a result of this state of the external logic signals, both the Not Write Enable Prime ($\overline{WE}'$) and the Not Read Enable Prime ($\overline{RE}'$) control signals are lowered when the Phase R clock signal makes a positive transition. Accordingly, the transistors Q20 and Q23 are turned off. Consequently, no information is transmitted to the gate terminal of the transistor Q214, and recirculation of data is precluded. However, since the Not Read Enable Prime ($\overline{RE}'$) control signal is low, and its complement control signal Read Enable Prime (RE') is high, the voltages on the nodes 258 and 259 are transmitted through the appropriate transistor Q30 and Q31 to the gate terminal of the transistor Q34 and Q35, respectively, so as to drive the node 86 with a read-out signal corresponding to the data applied to the node 51.

The Read Mode cycle of operation is held until the Not Read Enable ($\overline{RE}$) logic signal goes high again. When this occurs, the Read Enable Prime (RE') and the Not Read Enable Prime ($\overline{RE}'$) control signals change state, thus turning off the transistors Q34 and Q35. Therefore, at this time the input node 86 may be driven by the external circuitry, which is not shown in FIG. 4.

The circuit shown in FIG. 4, and described hereinabove, includes a self-correcting feature that prevents incorrect data from being read from the memory device during the Read-Modify-Write cycle. In particular, in the external logic sequence of operation the Not Read Enable Prime ($\overline{RE}'$) control signal makes a positive transition before the transistors Q34 and Q35 have completed their transition from the conducting to the non-conducting state. Thus, information at the node 86, and consequently, at the node 89 may comprise bits of data that are not desired to be written into the shift register 12*a*. These bits of data are considered to be incorrect data. If the transistor Q214 turns on, even for a short period of time, it is possible that this incorrect data may be transferred to the Phase G gate of the shift register 12*a*. However, if the transistor Q214 were conducting incorrect data, then the subsequent application of correct data would cause the transistor Q214 to turn off. In this case the transistor Q215 would tend to pull the electrons back out of the shift register, thus correcting the situation in order to enable the memory device to settle to its normal condition within a short period of time after the Not Read Enable ($\overline{RE}$) logic signal is applied. The effective time constant of the circuit containing the transistors Q214 and Q215 is relatively small. The Read-Modify-Write Mode cycle is terminated when the Not Phase clock signal makes a positive transition, thereby turning on the reset transistor Q27.

What is claimed is:

1. A charge coupled memory device having input/output means, said device comprising:

a. N CCD shift registers (wherein N is an integer from 1 to N), each having register input terminal means for receiving serial bits of data, and register output means for supplying serial bits of data from said shift registers, and each of said shift registers being capable of storing M bits of data (wherein M is an integer from 1 to M), whereby said memory device is capable of storing M×N bits of data;

b. write terminal means, coupled between said input/output means and the register input means of a first one of said shift registers for writing data into said memory device;

c. read terminal means, coupled to said input/output means for reading data from said memory device; and, d. N charge comparison circuits (wherein N is an integer from 1 to N), wherein each of N-1 of said circuits is uniquely coupled between the register output means of a corresponding one of said shift registers and the register input means of the next adjacent one of said shift registers, the Nth comparison circuit having an input terminal coupled to the output terminal means of the Nth shift register and having two output terminals for providing complementary output signals representative of the bits of data, wherein the first one of said two output terminals is coupled to said read terminal means of said memory device, and the second one of said two output terminals is coupled to both said write terminal means and said read terminal means so as to recirculate the serial bits of data through the shift registers, whereby the serial bits of data are recirculated through said N CCD shift registers at the same time the data is read from the memory device.

2. A charge coupled memory device as recited in claim 1 further characterized by the addition of N interfacing circuits (wherein N is an integer from 1 to N), wherein each of N-1 of said interfacing circuits is uniquely coupled between the output of a corresponding one of said charge comparison circuits and the input of a corresponding one of said shift registers, the Nth interfacing circuit being coupled between said means for writing data into said memory device and the input of the first one of said N CCD shift registers.

3. A charge coupled memory device as recited in claim 1, wherein each of said N charge comparison circuits comprises:

a. means for supplying a reference charge; and, b. a charge comparing means operative to compare the magnitude of an input charge with said reference charge and to develop an output signal if said input charge is greater than said reference charge, said output signal being a pulse of substantially constant magnitude over the pulse width.

4. A charge coupled memory device as recited in claim 1 and having a source of direct current potential, a source of ground potential, and a source of reference charge, wherein each of said N charge comparison circuits comprises:

a. charge comparison means including a first transistor having first source, drain and gate electrodes, and a second transistor having second source, drain and gate electrodes, said first and second source electrodes being connected in common, said first and second drain electrodes being coupled to said direct current potential source, said first gate electrode being coupled to said second drain electrode and to said reference potential source, said second gate electrode being coupled to said first drain electrode and defining an input node for receiving input charge, said reference charge being applied to said reference node, so that when input charge, applied to said input node exceeds said reference charge, the potential on said input node is less than that on said reference node, and when said reference charge exceeds said input charge the potential on said reference node is less than that on said input node;

b. means for applying said ground potential to said first and second source electrodes, thereby causing the transistor with the lesser potential on its gate electrode to conduct; and, c. output means having an input portion that is coupled to said first and second gate electrodes and having first and second output terminals for providing logic output signals in complementary form in response to the conducting transistor, whereby conduction of said first transistor produces a first output signal representative of a logic 1 on said first output terminal and second output signal representative of a logic 0 on said second output terminal and conduction of said second transistor produces a logic 0 on said first output terminal and a logic 1 on said second output terminal.

5. A charge coupled memory device as recited in claim 4, wherein said output means includes inverting means coupled to said respective gate electrodes responsive to the potential applied on said input and said reference nodes and operative to invert said input and reference potentials into said complementary output signals.

6. A charge coupled memory device as recited in claim 4, wherein said first output terminal is coupled to the input of the first one of said CCD shift registers so as to recirculate said first output signal through said N CCD shift registers.

7. A charge coupled memory device as recited in claim 4, wherein said means for applying a ground potential to said source electrodes includes a third transistor that has a third source electrode coupled to ground potential and a third drain electrode that is connected in common with said first and second source electrodes, said third transistor being rendered conducting after said reference charge is applied to said reference node thereby applying said ground potential to said first and second source electrodes.

8. A charge coupled memory device as recited in claim 4, wherein said first, second and third transistors have conduction threshold potentials that are raised with respect to normal.

9. A charge coupled memory device as recited in claim 6 including means for supplying external signals to the input of said memory device and means for breaking the coupling between said first output terminal and said input of the first one of said N CCD shift registers so as to enable external data to be supplied to said N CCD shift registers.

10. A charge coupled memory device as recited in claim 4, wherein said reference potential is intermediate the complementary output voltage signal elvels.

11. A charge coupled memory device as recited in claim 4, including a fourth transistor means having fourth source, gate and drain electrodes, said first output terminal being directly coupled to said fourth gate electrode and being capacitively coupled to said fourth source and drain electrodes in a bootstrap arrangement, thereby increasing the swing of said first output signal.

* * * * *